(12) United States Patent
Messinger et al.

(10) Patent No.: US 6,886,041 B2
(45) Date of Patent: Apr. 26, 2005

(54) SYSTEM FOR APPLICATION SERVER MESSAGING WITH MULTIPLE DISPATCH POOLS

(75) Inventors: Adam Messinger, San Francisco, CA (US); Don Ferguson, San Francisco, CA (US)

(73) Assignee: Bea Systems, Inc., San Jose, CA (US)

( * ) Notice: Subject to any disclaimer, the term of this patent is extended or adjusted under 35 U.S.C. 154(b) by 112 days.

(21) Appl. No.: 10/264,439

(22) Filed: Oct. 3, 2002

(65) Prior Publication Data

US 2003/0093499 A1 May 15, 2003

Related U.S. Application Data

(60) Provisional application No. 60/327,543, filed on Oct. 5, 2001.

(51) Int. Cl.$^7$ ............................................. G06F 15/173
(52) U.S. Cl. ....................................... 709/226; 709/203
(58) Field of Search ............................... 709/225, 226, 709/229, 203; 710/859, 39

(56) References Cited

U.S. PATENT DOCUMENTS 6,006,247 A  * 12/1999  Browning et al. .......... 718/102
6,304,906 B1 * 10/2001  Bhatti et al. ................ 709/227
6,321,265 B1    11/2001  Najork et al. ............... 709/224
6,401,126 B1 *  6/2002  Douceur et al. ............ 709/231
6,442,550 B1     8/2002  Rajamony .................... 707/10
6,691,208 B1 *  2/2004  Dandrea et al. ............ 711/112

OTHER PUBLICATIONS

Craig McClanahan, "Asynchronous request processing", www.servlets.com/archive/servlet/ReadMsg?msgId=360675&listName=struts-dev 2 pages, Feb. 12, 2001.*

Rick Strahl, Handling long Web Requests with Asynchronous Request Processing, www.west-wind.com/presentations/wwAsynchWebrequest/wwAsynchWebRequest.htm, Whole document, Apr. 9, 2001.*

* cited by examiner

*Primary Examiner*—Mehmet B. Geckil
(74) *Attorney, Agent, or Firm*—Fliesler Meyer LLP (57) ABSTRACT

An embodiment of the invention provides an ability to configure the dispatch policy in an application or transaction server. For servlets and JSP's this is configured on a per-URL (Uniform Resource Locator) basis, RMI and EJB it is configured on a per-method basis. Available dispatch options include the ability to execute the request in the same thread that read the request or to enqueue it on a queue which feeds a pool of worker threads. Using this configuration one can control various quality of service parameters of the requests. Requests may be expedited by executing them directly in the thread which read them, thus skipping the queue. Alternatively, some requests may be throttled by assigning them to a queue which is tended by only a limited number of threads.

34 Claims, 5 Drawing Sheets

SYSTEM FOR APPLICATION SERVER MESSAGING WITH MULTIPLE DISPATCH POOLS

CLAIM OF PRIORITY

This application claims priority from provisional application "SYSTEM FOR APPLICATION SERVER MESSAGING WITH MULTIPLE DISPATCH POOLS", Application No. 60/327,543, filed Oct. 5, 2001, and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

An embodiment of the invention relates generally to application and transaction servers and particularly to a system for supporting message queuing and threads with multiple dispatch pools.

CROSS REFERENCES

This application is related to Provisional Patent Application "SYSTEM FOR APPLICATION SERVER MESSAGING WITH ASYNCHRONOUS QUEUES", Application No. 60/327,530, Inventors: Adam Messinger and Don Ferguson, filed Oct. 5, 2001 and Utility Patent Application "SYSTEM FOR INTEGRATING JAVA SERVLETS WITH ASYNCHRONOUS MESSAGES", Application No. 10/264,973 Inventors: Adam Messinger, Sam Pullara and Dave Brown, filed Oct. 3, 2002 both applications are incorporated by reference herein.

BACKGROUND

The Java 2 Platform, Enterprise Edition (J2EE) specification, developed by Sun Microsystems, Inc., in collaboration with leaders from throughout the enterprise software arena, defines one of the current standards for developing multi-tier enterprise applications. J2EE provides a component-based approach to the design, development, assembly, and deployment of enterprise applications, which both reduces the cost and enables fasten design and implementation. The J2EE platform gives the developer a multi-tiered distributed application model, the ability to reuse components, a unified security model, and flexible transaction control. Not only can they deliver innovative customer solutions to market faster than ever, but the resultant platform-independent J2EE component-based solutions are not tied to the products and application program interfaces (APIs) of any one vendor.

Figure 1:
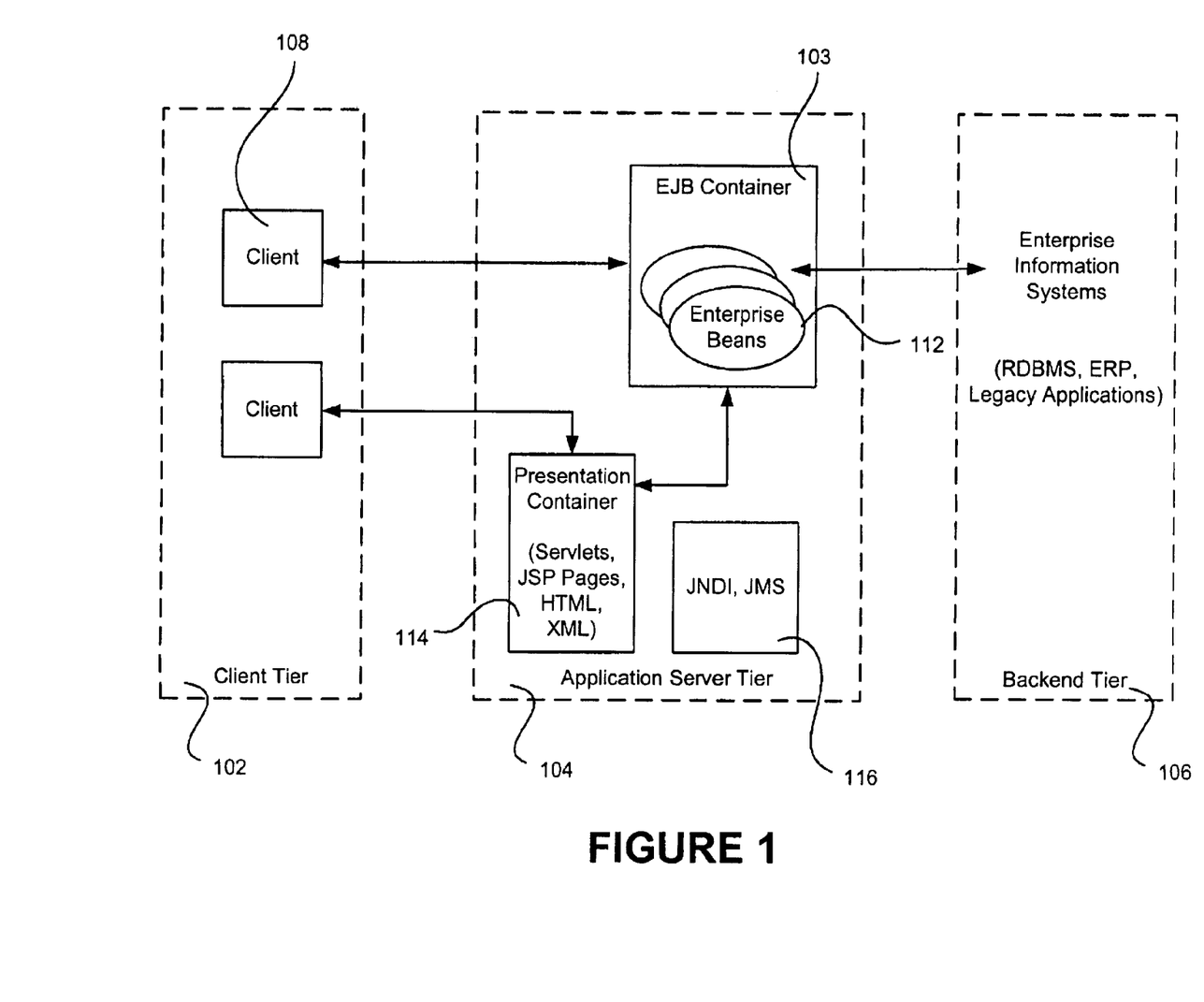
FIG. 1 shows an illustration of a J2EE compatible server architecture that can utilize an embodiment of the present invention.

The J2EE specification defines the following kinds of components: application client components; Enterprise JavaBeans (EJB); servlets and Java Server Pages (JSP) (also called Web components); and applets. A multi-tiered distributed application model implies that the application logic is divided into components according to function, and different application components may make up a J2EE application on the same or different servers. Where an application component is actually installed depends on which tier in the multi-tiered J2EE environment the application component belongs. These tiers are depicted in FIG. 1. As shown therein an application server tier 104 is used to develop EJB containers and/or presentation containers such as servlets, JSP, and html pages 114. These in turn are used as an interface between a client tier 102, where the clients 108 and client applications are deployed, and a backend tier 106, used for hosting enterprise or legacy applications such Enterprise Resource Planning (ERP) systems.

Client tier—These can be browsers, Java-based programs, or other Web-enabled programming environments running within the client tier, both inside and outside of corporate firewalls.

Application Server tier—Normally this tier hosts a combination of presentation logic and business logic to support client requests. Presentation logic is supported via JSP pages and servlets that display HTML pages, while business logic is supported via Remote Method Invocation (RMI) objects and EJBs 112. EJBs rely upon the container environment for transactions, lifecycle and state management, resource pooling, security, etc., which together make up the run time environment in which the beans are executed.

Back-end tier—This is generally a combination of existing applications and data stores. It is also referred to as the Enterprise Information Systems (EIS) tier, since it may include such systems as Enterprise Resource Planning (ERP), mainframe transaction processing, database systems, and other legacy information systems.

Since the components of a J2EE application run separately, and often on different devices, there needs to be a way for client and application server tier code to look up and reference other code and resources. Client and application code can, for example, use the Java Naming and Directory Interface (JNDI) 116 to look up user-defined objects such as enterprise beans, and environment entries such as the location of the Java Database Connector (JDBC) DataSource objects, which in turn are used for looking up resources in backend tier, and message connections.

Application behavior such as security and transaction management can be configured at deployment time on Web and enterprise bean components. This deployment time feature decouples application logic from the configuration settings that might vary with the assembly. The J2EE security model lets a developer configure a Web or enterprise bean component so that system resources are accessed only by authorized users. For example, a Web component can be configured to prompt for a user name and password. An Enterprise Bean component can be configured so that only persons in specific groups can invoke certain kinds of its methods. Alternatively, a servlet component might be configured to have some of its methods accessible to everyone, and a few methods accessible to only certain privileged persons in an organization. The same servlet component can be configured for another environment to have all methods available to everyone, or all methods available to only a select few.

Some application servers, such as the WebLogic Server product from BEA Systems, Inc., San Jose, Calif., use an Access Control List (ACL) mechanism that allows for fine-grained control of the usage of components running on the server. Using an ACL, a developer can define at the Java Method level what can, or cannot, be executed by which user or group of users. This ACL mechanism covers anything that runs on the application server except for EJBs, which have their own access control mechanism defined in the EJB specification. Security realms allow the administrator to import information from existing authorization or authentication systems into the ACL.

Java Servlets

A servlet is a program that extends the functionality of a Web server. A servlet receives a request from a client, dynamically generates the response (possibly querying databases to fulfill the request), and then sends the response containing an HTML or XML document to the client. Servlets are similar to CGI but are typically easier to write, since servlets use Java classes and streams. They execute faster because servlets are compiled to Java byte code and at run time the servlet instance is kept in memory, each client request spawning a new thread. Servlets make it easy to generate data to an HTTP response stream in a dynamic fashion. Each client request is performed as a new connection, so flow control does not come naturally between requests. To allow for this session management maintains the state of specific clients between requests. In some application servers, servlets make use of the HTTP session object to save their state between method requests. This object can be replicated in a clustered environment for failover purposes.

Java Server Pages

JSP pages are a text-based, presentation-centric way to develop servlets. JSP pages offer all the benefits of servlets, and when combined with a JavaBeans class, provide an easy way to keep content and display logic separate. Both JSP pages and servlets are more desirable than Common Gateway Interface (CGI), because they are platform-independent, and use less overhead. JSP pages can be used with JavaBeans classes to define Web templates for building a Web site made up of pages with a similar look and feel. The JavaBeans class performs the data rendering, so the templates have no Java code. This means they can be maintained by an HTML editor. Simple Web-based application using a JSP page can be used to bind content to application logic using custom tags or scriptlets instead of a JavaBeans class. Custom tags are bundled into tag libraries that are imported into a JSP page. Scriptlets are small Java code segments embedded directly in the JSP page.

Database Access Services (JDBC)

JDBC acts as a bridge to relational databases, and is modeled on the ODBC (Open Database Connectivity) specification. It decouples the database from the program code through the use of drivers. Some implementations of JDBC provide support for advanced data types, and also support the functionality of scrollable result sets and batch updates.

Java Messaging Services (JMS)

JMS is the J2EE mechanism used to support the exchange of messages between Java programs. This is how Java supports asynchronous communication, wherein the sender and receiver don't need to be aware of each other and thus can operate independently. JMS currently supports two messaging models:

Point to point—which is based on message queues. In this model message producer sends a message to a queue. A message consumer can attach itself to a queue to listen for messages. When a message arrives on the queue, the consumer takes it off the queue and responds to it. Messages can be sent to just one queue and will be used by just one consumer. Consumers have the option to filter messages to specify the exact message types they want.

Publish and subscribe—which allows producers to send messages to a topic and for all the registered consumers for that topic to retrieve those messages. In this case, many consumers can receive the same message.

Java IDL and Multi-Threaded Servers

In the CORBA world, attempts have been made to allow CORBA objects to use an Interface Definition Language (IDL) to specify a contract, i.e., how they are going to interact with other objects. With Java IDL, contracts may be defined between the Java world and the CORBA world. Starting with Sun's Java Development Kit (JDK) Version 1.2, an Object Request Broker (ORB) allows Java applications to invoke remote CORBA objects via the Internet InterORB (IIOP) protocol. In a multi-threaded CORBA server, event queues provide a method for implementing threading policies on that CORBA server. In practice the event queues support the desired threading policy for CORBA requests, and integrate the processing of non-CORBA events within the threading policy. A multi-threaded CORBA server, such as the Orbix server from Iona Software, can for example implement policies which determine how many threads are created, when those threads are created, and which requests are handled by which threads. Implementing a particular policy typically involves creating a number of queues and worker threads and programming a logic to determine which queue to use for each incoming event.

Multi-threaded CORBA servers can thus process several CORBA requests concurrently. One primary advantage of this is to increase overall throughput. Threading policies can be customized for different needs, depending on how the work of handling requests should be shared between them. These options include the following:

One thread per operation: In this scenario a new thread is created to handle each incoming request. This option provides maximum concurrency, but sometimes creates too many threads if the server receives a large number of concurrent requests at peak load.

Use of a thread pool: In this scenario requests are queued and handled by the first available thread in a pool of threads. The maximum number of threads, and hence the server load, is restricted by limiting the size of the pool.

One thread per object: Following this option one or more request queues are maintained for each object. This option provides full concurrency between objects but serializes access to each individual object.

One thread per client: A request queue is maintained for each client. This option ensures equal treatment of clients, by controlling the number of thread resources allocated to each.

Threading in J2EE Servers

One problem with current threading policies as used in J2EE-based transaction and application servers is the concept or prioritization of requests. Although threading policies can be designed for maximum throughput in terms of request management these are few options in terms of request prioritization. Many current server products use a pool of threads for reading requests from clients from the network. Once a complete request is read into the queue it must be dispatched for execution in the server. But there is little to allow a developer to prioritize the complete requests prior to dispatch.

Prioritization of requests is a commonly desired feature, but is difficult to implement because of concerns about the complexity it adds to the underlying server code and because of new problems, such as priority inversion, which it can create. The addition of multiple queues would provide the software administrator or developer with a priority mechanism that manages these concerns better than a true priority scheme would.

Throttling of requests is another feature commonly requested by application server customers. This is commonly requested where part of the workload requires a large amount of memory, CPU time, or other resource. The system can not process many of these requests simultaneously.

Many application servers provide dispatch options that allow a request to execute in the same thread that read the request or to enqueue it on a queue which feeds a pool of worker threads. Using this configuration one can control various quality of service parameters of the requests. For instance requests may be expedited by executing them directly in the thread which read them thus skipping the queue. Alternately some requests may be throttled by assigning them to a queue which is tended by only a limited number of threads.

SUMMARY

To address these demands an embodiment of the invention provides a system or mechanism for use with an application server, that enhances the servers threading model, i.e. the policy by which threads are assigned to perform work requests. Embodiments of the invention can be used with a wide range of application servers, including, for example, the WebLogic Server product from BEA Systems, Inc., San Jose, Calif. An application server, or any server, designed to use an embodiment of the invention employs a threading model which uses multiple thread pools—including an asynchronous pool (sometimes referred to as reader threads) and a synchronous pool (referred to as execute threads). This combination of pools allows the system to prioritize requests. The design also successfully tolerates user code that performs blocking operations.

In one embodiment of the invention, the asynchronous thread pool waits on an asynchronous input mechanism (referred to herein as a multiplexor, or muxer) for asynchronous read results to become available. Once a result is available, a thread from the pool looks at the message and dispatches it by making the appropriate callbacks. The dispatch callbacks usually queue the request for later processing by the synchronous thread pool. However, certain non-blocking, priority requests are services directly in the callback. By aggressively accepting input, these high priority requests do not wait to be read while lower priority requests run.

The synchronous thread pool waits on a queue of requests. Once a request is available a thread from the synchronous pool takes the request from the queue, processes it, and sends out the result. While processing the request, the thread may execute code, such as sending out the result, which causes the thread to block.

The addition of asynchronous output and asynchronous responses alleviates some of the need for thread process tuning, which is a common task in traditional systems. In addition, an embodiment of the invention allows for configuration of multiple synchronous thread pools so as to provide more fine-grained control over the processing of different request types.

An embodiment of the invention also supports the ability to provide multiple execute queues within a single server. These queues are individually similar to current execute queues. Each execute queue has a pool of worker threads assigned to pulling work from the queue. In accordance with one embodiment of the invention, each server has one default execute queue and either zero, or one or more, custom execute queues. The addition of multiple queues provides several benefits over traditional systems, including support for prioritization, throttling of requests and reduced queue contention. Queues can be independently allocated for high priority and low priority requests. The system administrator can then tune the number of threads assigned to these queues until the required throughput for each class of work is achieved.

DETAILED DESCRIPTION

Broadly described, an embodiment of the invention provides extensions for a flexible dispatch policy system for use with transaction, application and messaging servers, and particularly for use with RMI (Remote Method Invocation), EJB (Enterprise Java Bean) and Servlets. An application server transaction server, or messaging server (all commonly hereinafter simply referred to as application server), that incorporates an embodiment of the invention uses a pool of threads for reading requests from clients from the network. Once a complete request is read, it must be dispatched for execution in the server. An embodiment of the invention provides the ability to configure this dispatch policy. For servlets this is configured on a per-URL (Uniform Resource Locator) basis. For RMI and EJB the dispatch policy is configured on a per method basis.

Dispatch options provided by an embodiment of the invention allow the request to be executed in the same thread that read the request, or alternatively to be enqueued on a queue which feeds a pool of worker threads. Using this variable dispatch configuration one can control various quality of service parameters of the requests. For example, requests may be expedited by executing them directly in the thread which read them, thus skipping the queue. Alternately some requests can be throttled by assigning them to a queue which is tended by only a limited number of threads.

An embodiment of the invention provides new features related to application server messaging but which can be used with any server type that requires messaging of some sort. At the core of every server's design is the threading model, the policy by which threads are assigned to perform work requests. In accordance with an embodiment of the invention, the server employs a threading model which uses two thread pools an asynchronous pool (reader threads) and a synchronous pool (execute threads). This combination of pools and flexibility in dispatch options allows an administrator to effectively prioritize requests, while tolerating user code that performs blocking operations.

Figure 2:
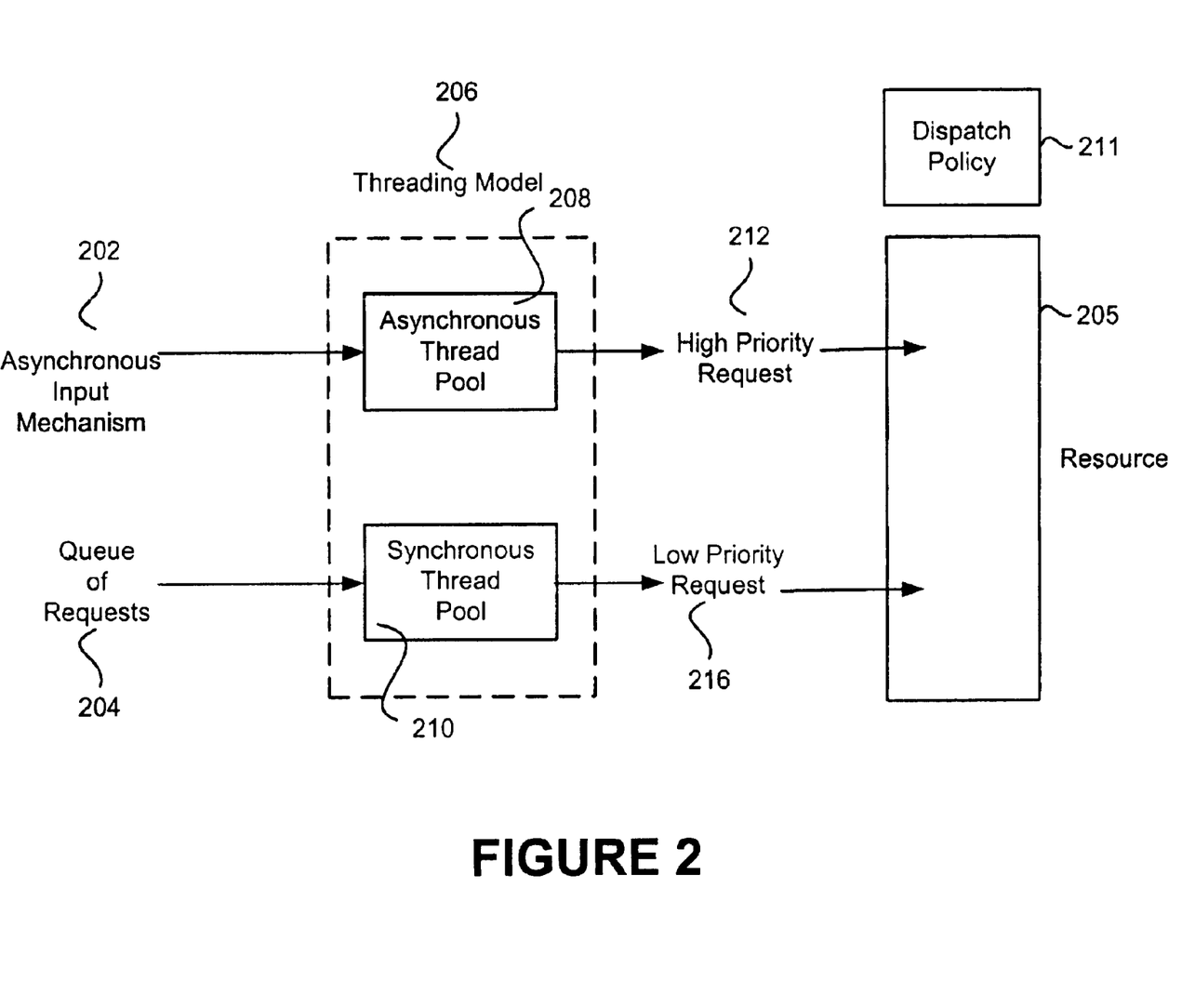
FIG. 2 shows a threading model in accordance with an embodiment of the invention.

FIG. 2 shows an illustration of a thread pool 206 as provided by an embodiment of the invention that is used to pass requests to a server resource 205. The server includes configuration information for each resource that determines the dispatch policy 211 to be used with a particular resource. In accordance with one embodiment, the asynchronous thread pool 208 waits on an asynchronous input mechanism 202 (sometimes referred to as a muxer) for asynchronous read results to become available. Once a result is available, a thread from the pool looks at the message and dispatches it by making the appropriate callbacks. The dispatch callbacks usually queue the request for later processing by a synchronous thread pool. However certain non-blocking, priority requests are serviced directly in the callback. By allowing the asynchronous thread pool to aggressively accepting input, high priority requests 212 do not wait to be read while low priority requests 216 run. Since these threads should never block there are usually a low number of them, perhaps only one per CPU. Embodiments of the invention additionally provide the ability for the asynchronous thread pool to perform network output operations. This particular feature is described in more detail in Provisional Patent Application "SYSTEM FOR APPLICATION SERVER MESSAGING WITH ASYNCHRONOUS QUEUES", Application No. 60/327,530, Inventors: Adam Messinger and Don Ferguson, filed Oct. 5, 2001 and Utility Patent Application "SYSTEM FOR INTEGRATING JAVA SERVLETS WITH ASYNCHRONOUS MESSAGES", Application No. 10/264,973, Inventors: Adam Messinger, Sam Pullara and Dave Brown, filed Oct. 3, 2002 both applications are incorporated by reference herein.

As shown in FIG. 2, the synchronous thread pool 210 waits on a queue of requests 204. Once a request is available, a thread from the pool takes the request from the queue, processes it, and sends out the result 216 to the resource 205. While processing the request the thread may execute code, such as sending out the result, which causes the thread to block. The number of threads should therefore be tuned so that there is always one thread per CPU that is in the runnable state. Appropriate tuning of a server is important for performance reasons. The addition of asynchronous output and asynchronous responses as used in an embodiment of the invention alleviates some of the need for this tuning. An embodiment of the invention also provides an administrator until the ability to configure multiple synchronous thread pools so as to provide more fine-grained control over the processing of different request types.

Dispatch

Dispatch is the process of taking a server request and passing it to the appropriate place to be serviced. In an application server or server that may use an embodiment of the invention, there are typically two types of dispatch, direct dispatch and queued dispatch. The server request may be any signal from the server including for example the result of input read from the network, a time trigger, or the continuation of some other piece of work.

In direct dispatch, the thread which generated the incoming message also processes that message. The dispatching thread is not replaced with another thread while it is processing the request so it is important that the work to be performed will not block the dispatching thread for any significant amount of time. For example if socket reader threads are blocked servicing requests then the server will not be able to handle any new incoming messages and will be unresponsive to further input. Similarly if time trigger threads are blocked then important timing events in the server will not be delivered. For this reason direct dispatch is typically made available through internal APIs, and is used only for high-priority system-level messages.

Figure 3:
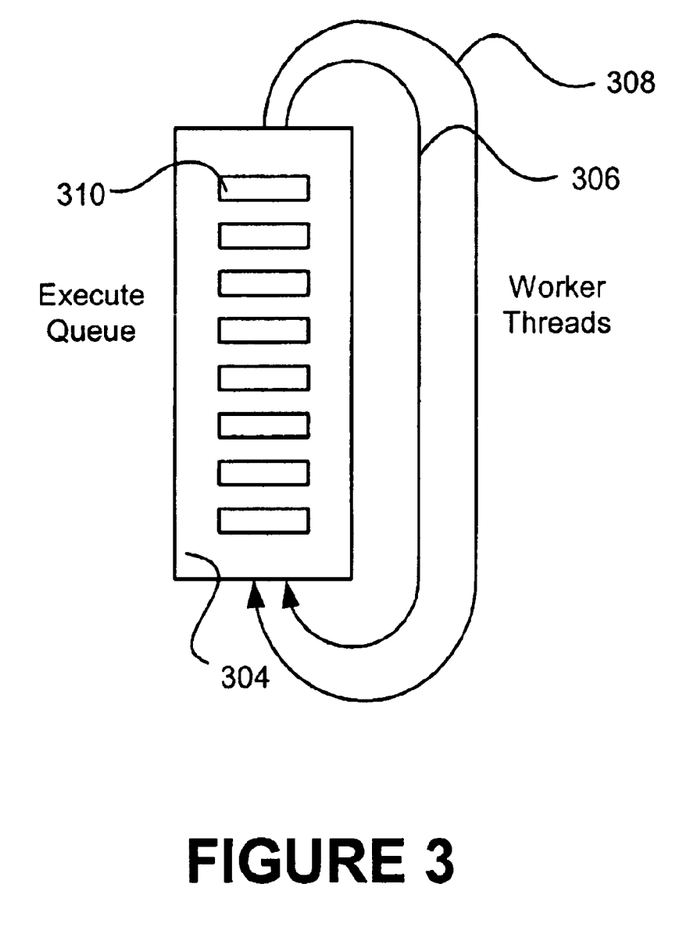
FIG. 3 shows an illustration of a multiple dispatch queue system in accordance with an embodiment of the invention.

FIG. 3 shows a traditional execute queue mechanism. As shown therein, a request from the client directed to a particular resource, such as a Uniform Resource Locator (URL) or a database, is queued on an execute queue 304. A set of one or more worker threads 306, 308 or thread processes retrieve the entries 310 from the queue and execute them against the resource, returning the result to the client. The problem with this mechanism is that the queue operates on a first in/first out manner, and there is no way to prioritize particular entries so as to process one entry in the queue before another.

In queued dispatch, the dispatching thread puts the incoming message on a queue where it will later be dequeued and serviced by a worker thread. In some embodiments there is only one execute queue, and one pool of execute threads assigned to dequeue and service requests from that queue. Other embodiments can use multiple execute queues. The queue length may be bounded or unbounded, although when the queue length is unbounded care must be taken to prevent problems with memory usage. Typically all user requests are dispatched to a queue rather than directed.

Multiple Queues

Figure 4:
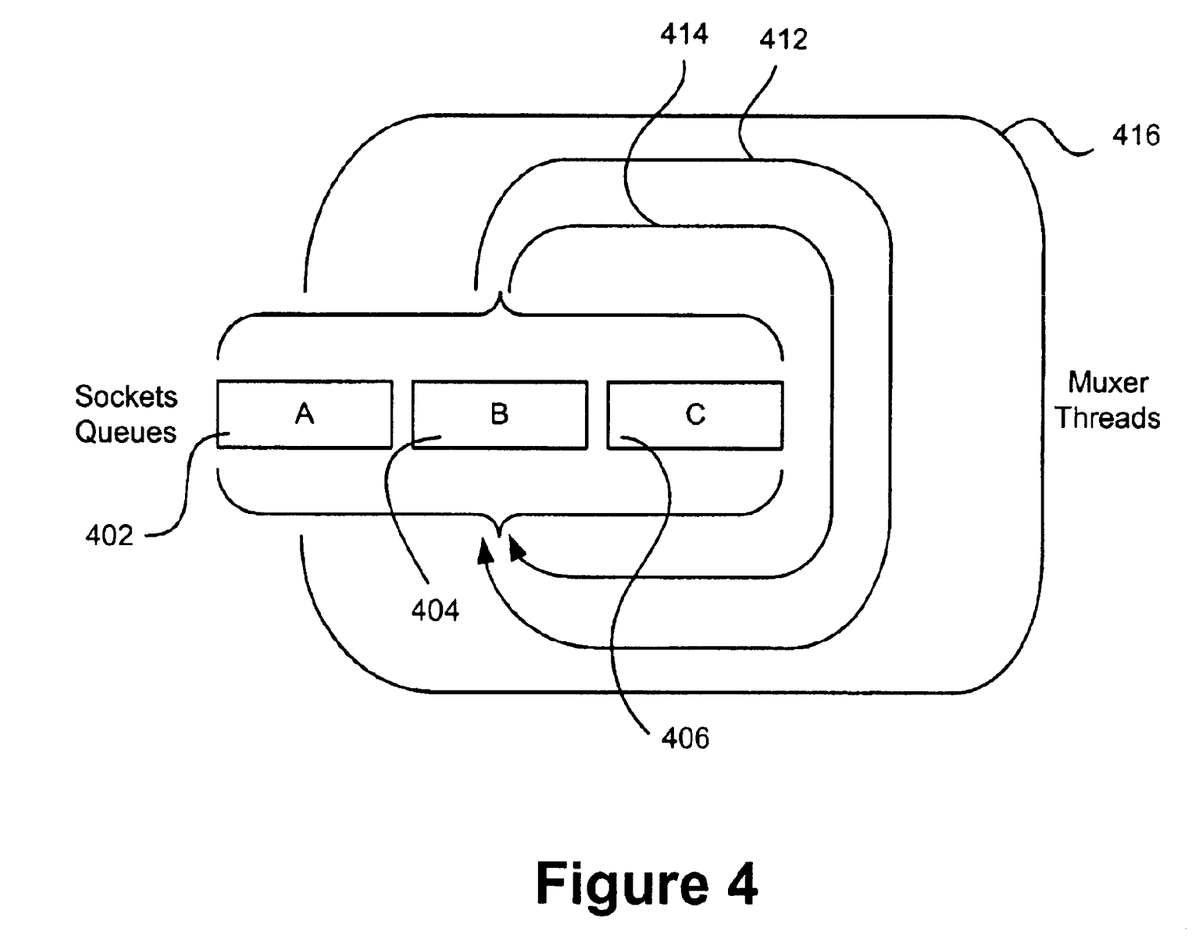
FIG. 4 shows an illustration of a multiple thread dispatch system in accordance with an embodiment of the invention.

FIG. 4 shows how multiple queues provided by an embodiment of the invention are used to build a dispatch policy. As shown in FIG. 4, requests from the client are passed to a queue socket selected from a plurality of queue sockets 402, 404, 406. The sockets operate in parallel, allowing entries on one socket to be performed at the same time, or prior to, those in another socket. This separate and parallel operation allows the system to prioritize the requests. A set of one or more asynchronous threads 412, 414, 416 are used to service the socket requests and to provide access to the resource. Groups of asynchronous threads (e.g. 412 and 414) can be shared between groups of sockets (e.g. 404 and 406). Alternatively, a socket 402 may have a dedicated thread 416, to allow for reliable or high priority servicing of the particular requests within that socket. Application servers embodying or incorporating an embodiment of the invention support the ability to have multiple execute queues in a single server. Typically, each execute queue has a pool of worker threads assigned to pulling work from the queue. In one embodiment each server has one default execute queue, and either zero or one or more custom execute queues. The addition of multiple queues provides several benefits, including support for prioritization, throttling of requests and reduced queue contention.

Request Prioritization

As described above, prioritization of requests is a commonly desired feature. Traditionally this was a difficult area to address because of concerns about the complexity it might add to the underlying code, and because of additional problems, such as priority inversion, which it could create. As used in an embodiment of the invention, the addition of multiple queues provides a priority mechanism that manages these concerns better than a "true" priority scheme would. If the administrator so desires then queues can be independently allocated for high priority and low priority requests. The administrator can then tune the number of threads assigned to these queues until the required throughput for each class of work is achieved.

Request Throttling

Throttling of requests is a feature commonly requested by application server users. Throttling is important in those instances where part of the workload requires a large amount of memory, CPU time, or other resource. Typically the system can not process many of these requests simultaneously. An embodiment of the invention provides mechanisms for request throttling in that all of these types of requests can be sent to a queue which is configured with the proper amount of threads to ensure that system resources are conserved.

Reduction in Queue Contention

Queue contention is a problem in benchmarks of heavily loaded systems serving multiple short requests. An embodiment of the invention provides a mechanism to successfully tackle this problem by spreading the workload out over several queues, queue contention can be reduced. Requests be distributed across the queues in such a manner as to maximize throughput.

Figure 5:
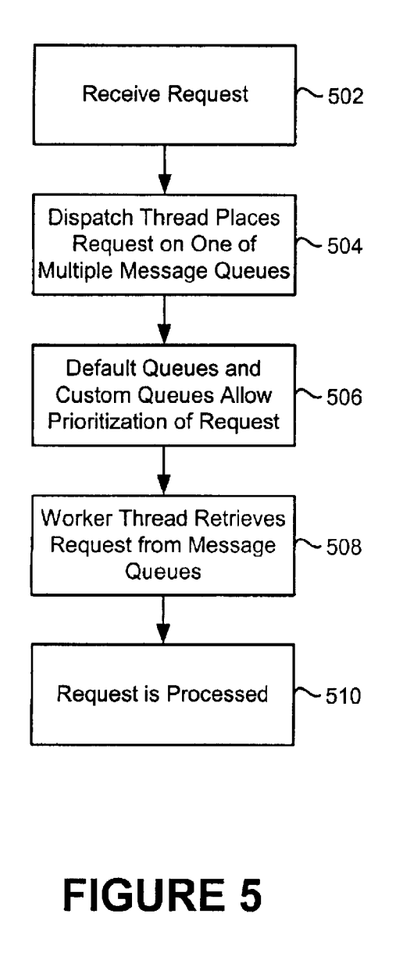
FIG. 5 shows a flowchart of a multiple dispatch process in accordance with an embodiment of the invention.

FIG. 5 shows a flowchart of the multiple queue dispatch policy in accordance with an embodiment of the invention. As shown therein, in step 502, a request to access a particular resource is received by the server. This may be a request to access, for example, a particular service, a URL, or a database. In step 504, a dispatch thread places the request on one of the multiple message queues or sockets. The combination of providing a default execute queue, and multiple customer execute queues, allows, in step 506, the system or system administrator the ability to prioritize the request, by specifying which socket or queue it should be placed in. In step 508, a worker thread retrieves the request from the appropriate message queue, and, in step 510, the request is processed at the server, and the result returned to the client.

RMI and HTTP Implementation

In accordance with one embodiment of the invention a typical Remote Method Invocation (RMI) implementation is adapted to take advantage of multiple queues. The RMI descriptor is generalized to allow a per-method queuing policy to be set. This functionality provides a mechanism to specify director queued dispatch. In one embodiment for use with Java Virtual Machines (JVM's), a RequestDispatcher message is dispatched to the RJVM level. The RJVM then queries its RuntimeDescriptor and determines which dispatch policy should be applied to the request.

Adapting a servlet implementation to take advantage of multiple queues can be similarly performed. In one embodiment the meta data describing the dispatch policy can be placed in the servlet's deployment descriptor. The point at which requests are normally queued is to a point where the servlet to be invoked has been determined. At this point the appropriate dispatch policy can be determined, and appropriate action taken. HTTP tunneling mechanisms can also be modified to use this mechanism. In some implementations, timing services may be adapted to take advantage of the multiple queues. Additions to any API may also be made to allow the specification of the dispatch policy for a particular timer. This can be integrated with current direct dispatch mechanisms that services the trigger directly in the timing thread.

In a particular application server, several internal implementations use queued dispatch to process work ancillary to the request currently being processed. This is often done to prevent holding locks longer than necessary, but with the addition of multiple queues can also be used to differentiate between priorities of work by queuing the ancillary request in a different queue.

Additionally many customers have requested the ability to perform this same queued dispatch of ancillary requests. In one embodiment the invention allows users to queue ajava.lang.Runnable function on a specified queue. This Runnable is then wrapped in an ExecuteRequest and placed on the desired queue.

Configuring Execute Queues & Thread Pools

To allow configuration of the execute queues and thread pools, an embodiment of the invention provides a set of commands and syntaxes. The following section provides a guide to configuring servlets, jsps, ejbs, and rmi objects to use these pools in accordance with one embodiment of the invention. It will be evident that an embodiment of the invention is not limited to the particular implementations described below which are given for purposes of illustration, but instead can be used with other implementations and with other application servers or servers.

Configuring Execute Queues

In the server configuration (for example the config.xml file), the developer can define the set of ExecuteQueues via an "ExecuteQueues" tag in the Server configuration, e.g.:

```
<Server
    Name="myserver"
    NativeIOEnabled="true"
    ListenPort="7701"
    ExecuteQueues="testqueue" >
<ExecuteQueue
    Name="testqueue"
    ThreadCount="4"   />
```

The example shown above would result in the creation of an execute queue named testqueue, with an associated pool of four (4) execute threads.

Configuring a Servlet to Use an ExecuteQueue

To configure a servlet, the developer or administrator can use the servlet init parameters to set the queue name, for example via the tag "wl-dispatch-policy" in systems that use web.xml files for configuration. The web.xml file contains an init-param section like the exemplary one shown below:

```
<servlet>
    <init-param>
        <param-name>wl-dispatch-policy</param-name>
        <param-value>testqueue</param-value>
        <description>Queue to use for processing requests
        to this servlet
        </description>
    </init-param>
</servlet>
```

Configuring a JSP to Use an ExecuteQueue

JSPs can be registered like servlets. The following code example shows a JSP registered to use a queue named "testqueue":

```
<servlet>
    <servlet-name>foo</servlet-name>
    <jsp-file>/myapp/foo.jsp</jsp-file>
    <init-param>
        <param-name>wl-dispatch-policy</param-name>
        <param-value>testqueue</param-value>
    </init-param>
</servlet>
```

Configuring EJB and RMI to Use an ExecuteQueue

EJBC and RMIC can be modified to take a dispatchPolicy flag, for allowing the configuration of dispatch policy or the command line, i.e.:

java weblogic.rmic-dispatchPolicy testqueue . . .
java weblogic.ejbc-dispatchPolicy testqueue . . .

Priorities and Quality of Service

Some embodiments of the invention allow for setting the priority of threads within a particular thread pool. In accordance with one embodiment of the invention however no mechanism is provided to allow the configuration to set the priority of the threads in the pool. This is intentional since the semantics of thread scheduling varies between platforms, and the system is less likely to run into starvation/priority inversion problems if all execute threads have the same priority. However, one can still dispatch high-priority traffic to a lightly used queue, or to one with a larger number of execute threads, and achieve the goal of servicing high priority requests faster without explicit use of thread priorities.

A topic closely related to prioritization is quality of service (QOS). Using the dispatch policy one can guarantee a certain type of request will have a certain number of threads. This can be useful if there are some types of requests which must continue to be processed at a fixed rate, regardless of any other load on a machine.

Deadlock Avoidance

A good reason to use a separate execute queue is to avoid deadlock conditions. When the servicing of a request requires additional execute requests to complete, a separate queue can be configured for the additional requests. For example, consider the situation in which a servlet "a" reads from a JMS queue "b". If all of the server's execute threads are executing servlet "a", then there will be no execute threads left to deliver messages from queue "b", so none of the work can progress. This situation can be avoided by defining a separate queue for servlet "a".

Throttling and Optimizing Throughput

Another good reason to use a separate queue is to throttle requests which use some fixed pool of resources. For example, if a particular job uses a lot of memory it may be more optimal to dispatch it to a queue with a limited number of associated threads. In this way the system can limit the maximum number of jobs of this type which are running simultaneously, and minimize any risk of the server running out of memory.

A related use is to separate those requests which require access to a resource from one particular pool, from those requests in another pool which don't require access. For example, consider a case where a server is serving two EJBs. EJB 'a' uses a connection pool to access a database, while EJB 'b' performs only some in-memory work (or perhaps uses a different pool.) If the number of threads is greater than the number of connections in the pool, then the system may encounter a situation wherein several threads are blocked trying to get a connection from the pool while processing requests for 'a'. At the same time there may be other requests for 'b' sitting in the queue which could proceed if only there were free execute threads. By dispatching 'a' and 'b' requests to different queues one can avoid this situation.

Performance Considerations

Having multiple execute queues is a very powerful tool, but should be used or configured with care. Some of the things the administrator should consider include:

Wasteful use of resources: Because each queue is assigned a fixed number of threads it is possible to have many threads doing nothing while requests on other queues sit idle. Threads are not cheap resources, so allocating extra threads should be avoided.

Livelocks and priority inversion: While judicious use of separate queues can reduce the chance of deadlocks as explained above, they also introduce a new class of possible problems which can be quite difficult to debug. As a trivial example it is possible that two remote calls made from the same client to the same server, but dispatched to separate queues, will return in a different order than anticipated.

The foregoing description of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for receiving and handling requests from a client application to a server resource, comprising:
   a server request interface that receives requests from a client to access a server resource;
   a threading model of said server that includes an asynchronous pool of threads that wait on an asynchronous input logic for said requests;
   a plurality of execute queues, configured to queue said requests for access to the server resource, wherein each execute queue has a pool of threads assigned to pull requests from said execute queue and execute the requests against the server resource; and,
   a dispatch policy configured on a per-resource basis, wherein said dispatch policy is used by said asynchronous pool of threads upon receiving input at said asynchronous input logic to dispatch said requests to a selected one of said execute queues, wherein said pool of threads associated with each execute queue executes the requests against said server resource.

2. The system of claim 1 wherein the request specifies a quality of service to be provided to the client application in accessing the resource.

3. The system of claim 1 wherein multiple execute queues can be configured for each resource.

4. The system of claim 1 wherein the server specifies by the dispatch policy either direct dispatch or queued dispatch.

5. The system of claim 1 wherein the resource is a servlet.

6. The system of claim 1 wherein the resource is a Java Servlet Page.

7. The system of claim 1 wherein the resource is associated with a particular execute queue name.

8. The system of claim 1 wherein the pool of threads for each execute queue can be configured to allow for prioritization of requests associated with that execute queue.

9. The system of claim 1 wherein said pool of threads for at least one execute queue are asynchronous.

10. The system of claim 9 wherein a pool of asynchronous threads are shared among multiple execute queues.

11. The system of claim 1 wherein said pool of threads for at least one execute queue are synchronous.

12. The system of claim 1 wherein said dispatch policy is configured on a per-resource basis to queue specific requests by priority on a selected one of said execute queues.

13. A method for receiving and handling requests from a client application to a server resource, comprising the steps of:
   receiving requests from a client to access a server resource;
   waiting on an asynchronous input logic for the requests by an asynchronous pool of threads;
   receiving input at said asynchronous input logic by said asynchronous pool of threads;
   queuing each request by said asynchronous pool of threads on one of a plurality of execute queues, that is configured to queue requests for access to the server resource, in accordance with a dispatch policy that is configured on a per-resource basis to queue specific requests on a selected one of said execute queues, wherein each execute queue has a pool of threads assigned to pull requests from said execute queue and executes the requests against the resource.

14. The method of claim 13 wherein the request specifies a quality of service to be provided to the client application in accessing the resource.

15. The method of claim 13 wherein multiple execute queues can be configured for each resource.

16. The method of claim 13 wherein the client application specifies either direct dispatch or queued dispatch.

17. The method of claim 13 wherein the resource is a servlet.

18. The method of claim 13 wherein the resource is a Java Servlet Page.

19. The method of claim 13 wherein the resource is associated with a particular execute queue name.

20. The method of claim 13 wherein the pool of threads for each execute queue can be configured to allow for prioritization of requests associated with that execute queue.

21. The method of claim 13 wherein said pool of threads for at least one execute queue are asynchronous.

22. The method of claim 21 wherein a pool of asynchronous threads are shared among multiple execute queues.

23. The method of claim 13 wherein said pool of threads for at least one execute queue are synchronous.

24. The method of claim 13 wherein said dispatch policy is configured on a per-resource basis to queue specific requests by priority on a selected one of said execute queues.

25. A system for receiving and handling requests from a client application to a server resource, comprising:

a server request interface for that receives requests from a client to access a server resource;

a threading model of said server that includes an asynchronous pool of threads that wait on an asynchronous input logic for said requests and a synchronous pool of threads that are associated with a queue of requests; and, a dispatch policy configured to be used for said server resource, wherein said asynchronous pool of threads upon receiving input at said asynchronous input logic use said dispatch policy to dispatch said requests to said queue, wherein said synchronous pool of threads associated with said queue executes the requests against said server resource.

26. The system of claim 25 wherein said asynchronous pool of threads execute said requests against said server resource without dispatching to said queue.

27. The system of claim 25 wherein said dispatch policy is based on priority of said requests.

28. The system of claim 25 wherein said thread model comprises of multiple synchronous thread pools assigned to said queue to provide fine-grained control over processing of different request types.

29. A method for receiving and handling requests from a client application to a server resource, comprising the steps of:

receiving requests from a client to access a server resource via a server request interface;

waiting on an asynchronous input logic for the requests by an asynchronous pool of threads;

receiving input at said asynchronous input logic by said asynchronous pool of threads;

dispatching said requests to a queue by said asynchronous pool of threads using a dispatch policy for said server resource, wherein said queue is associated with a synchronous pool of threads;

pulling said requests from said queue by said synchronous pool of threads; and, executing said requests by said synchronous pool of threads against said server resource.

30. The method of claim 29 wherein said asynchronous pool of threads execute said requests against said server resource without dispatching to said queue.

31. The method of claim 29 wherein said dispatch policy is based on priority of said requests.

32. The method of claim 29 wherein said thread model comprises of multiple synchronous thread pools assigned to said queue to provide fine-grained control over processing of different request types.

33. A system for receiving and handling requests from a client application to a server resource, comprising:

a server request interface that receives requests from a client to access a server resource;

a plurality of execute queues, configured to queue said requests for access to the server resource, wherein each execute queue has a pool of threads assigned to pull requests from said execute queue and executes the requests against the server resource; and, a dispatch policy configured on a per-resource basis to queue specific requests on a selected one of said execute queues, wherein said pool of threads is associated with each execute queue to execute the requests against said server resource.

34. A method for receiving and handling requests from a client application to a server resource, comprising the steps of:

receiving requests from a client to access a server resource;

dispatching the requests to a plurality of execute queues using a dispatch policy for said server resource, wherein each execute queue is associated with a pool of threads;

pulling the requests from each execute queue by the associated pool of threads; and, executing the requests by said pool of threads against said server resource.

* * * * *